US010045008B2

(12) United States Patent
Kwon et al.

(10) Patent No.: US 10,045,008 B2
(45) Date of Patent: Aug. 7, 2018

(54) METHOD FOR PROCESSING IMAGES IN A STEREO VISION SYSTEM AND APPARATUS FOR SAME

(75) Inventors: Gee Hwan Kwon, Seoul (KR); Yong Won Sung, Namyangju-si (KR)

(73) Assignee: GOLFZON CO., LTD., Daejeon (KR)

( * ) Notice: Subject to any disclaimer, the term of this patent is extended or adjusted under 35 U.S.C. 154(b) by 419 days.

(21) Appl. No.: 14/369,191

(22) PCT Filed: Dec. 30, 2011

(86) PCT No.: PCT/KR2011/010383
§ 371 (c)(1),
(2), (4) Date: Jun. 27, 2014

(87) PCT Pub. No.: WO2013/100239
PCT Pub. Date: Jul. 4, 2013

(65) Prior Publication Data
US 2015/0002639 A1    Jan. 1, 2015

(30) Foreign Application Priority Data

Dec. 29, 2011   (KR) .................. 10-2011-0145882
Dec. 29, 2011   (KR) .................. 10-2011-0145883
Dec. 29, 2011   (KR) .................. 10-2011-0145884

(51) Int. Cl.
*H04N 13/02* (2006.01)
*H04N 13/00* (2018.01)

(52) U.S. Cl.
CPC ..... *H04N 13/0296* (2013.01); *H04N 13/0239* (2013.01); *H04N 13/0253* (2013.01); *H04N 2013/0085* (2013.01)

(58) Field of Classification Search
CPC . G06K 9/00255; H04N 13/0239; H04N 13/04
USPC ............................................. 348/47; 382/154
See application file for complete search history.

(56) References Cited

U.S. PATENT DOCUMENTS

| | | | |
|---|---|---|---|
| 2010/0326962 A1* | 12/2010 | Calla ............. | B23K 9/0956 |
| | | | 219/76.14 |
| 2011/0069156 A1* | 3/2011 | Kurahashi ....... | G06K 9/00255 |
| | | | 348/47 |
| 2011/0230273 A1* | 9/2011 | Niegowski ........ | A43B 3/0005 |
| | | | 473/199 |
| 2013/0039538 A1* | 2/2013 | Johnson ........... | G06T 7/20 |
| | | | 382/103 |

FOREIGN PATENT DOCUMENTS

| | | | |
|---|---|---|---|
| JP | 2003158660 A | * | 5/2003 |
| KR | 10-0697626 B1 | | 3/2007 |
| KR | 10-2008-0098136 A | | 11/2008 |
| KR | 10-1048090 B1 | | 7/2011 |

* cited by examiner

*Primary Examiner* — Jamie Atala
*Assistant Examiner* — Masum Billah
(74) *Attorney, Agent, or Firm* — Revolution IP, PLLC

(57) ABSTRACT

Disclosed an apparatus for processing images in a stereo vision system including: an image capturing unit including first and second cameras for obtaining image information by capturing a subject, and a lighting unit for emitting a flash during the image capturing; and a camera controller for controlling the image information to be obtained by cross-acquiring images of the subject in a predetermined time interval without the synchronization of the first and second cameras.

20 Claims, 12 Drawing Sheets (a) PARALLEL STEREO CAMERAS
(b) CROSSING STEREO CAMERAS (a)            (b)            (c)

METHOD FOR PROCESSING IMAGES IN A STEREO VISION SYSTEM AND APPARATUS FOR SAME

CROSS REFERENCE TO PRIOR APPLICATIONS

This application is a National Stage Application of PCT International Patent Application No. PCT/KR2011/010383 filed on Dec. 30, 2011, under 35 U.S.C. § 371, which claims priority to Korean Patent Application Nos. 10-2011-0145882 filed on Dec. 29, 2011, 10-2011-0145883 filed on Dec. 29, 2011, and 10-2011-0145884 filed on Dec 29, 2011, which are all hereby incorporated by reference in their entirety.

TECHNICAL FIELD

The present invention relates to a method and apparatus for processing images in a stereovision system and, more particularly, to a method and apparatus for processing images in a stereovision system to achieve the performance of high-performance cameras by alternately grabbing images using a plurality of low-performance cameras included in the stereovision system.

The present invention also relates to a method and apparatus for processing images in a stereovision system to efficiently capture images using a plurality of low-performance cameras included in the stereovision system by obtaining predicted image information based on image information of images alternately grabbed by the cameras and thus obtaining information about physical characteristics of a subject.

The present invention also relates to a method and apparatus for processing images in a stereovision system to reduce system load and efficiently capture images by switching shooting modes according to the state of a subject.

The present invention also relates to a method and apparatus for processing images in a stereovision system to capture close-up images of a rapidly moving subject by alternately grabbing images using a plurality of low-performance cameras included in the stereovision system.

BACKGROUND ART

A plurality of image processing apparatuses for obtaining physical information, e.g., speed, direction, spin, etc., of a subject using image information obtained by capturing images of a still or moving subject have been introduced.

In particular, image processing apparatuses including digital cameras, e.g., digital single lens reflex (DSLR) camera, are currently popularized among consumers, and high-performance and low-price image processing apparatuses are in wide use due to development of related technologies.

One of various functions of an image processing apparatus is to detect or recognize a subject on obtained image information. This function cannot be realized using a single camera and at least two or more cameras are necessary. A system used to realize the above function is a stereovision system.

A stereovision system corresponds to computer vision for implementing the visual system of a person, and refers to an image system including two cameras, e.g., left and right cameras. The stereovision system can be used not only for automatic parking and unmanned driving of a car in industrial fields, but also to detect the motion, speed, etc. of a player in sports games and to detect the speed, direction, etc. of a ball based on obtained image information in ball games, e.g., baseball, golf and soccer.

DISCLOSURE

Technical Problem

According to a conventional method for processing images in a stereovision system, when a subject moves at a high speed or when close-up images of the subject are captured, a camera speed indicating the speed of capturing images by exposing film through an exposure device of a camera should be very high. However, a camera having a high camera speed is very high-priced and thus a stereovision system may not be easily implemented using such cameras. Accordingly, a method capable of achieving the performance of high-performance cameras using low-performance and low-price cameras is demanded.

Further, for a scene in which a subject stays still and then moves, e.g., a scene in which a golf player hits a ball which stays still on the field, or a scene in which a pitcher throws a baseball which is in the glove to a catcher, if images are captured constantly at a high camera speed, unnecessary images are analyzed and stored and thus system load can be increased. Accordingly, a method for switching shooting modes of an image processing apparatus according to the state of a subject is demanded.

In addition, since a plurality of cameras should grab images of a subject in time synchronization to obtain information about physical characteristics of the subject using a stereovision system, it is very hard to obtain information about physical characteristics of a subject which moves at an ultrahigh speed by capturing close-up images of the subject. Accordingly, a method for obtaining information about physical characteristics of a subject even when a plurality of cameras included in a stereovision system do not grab images of the subject in time synchronization is demanded.

It will be appreciated by persons skilled in the art that that the technical problems to be solved by the present invention are not limited to what has been particularly described hereinabove and other technical problems will be more clearly understood from the following detailed description taken in conjunction with the accompanying drawings.

Technical Solution

Therefore, the present invention has been made in view of the above problems, and it is an object of the present invention to provide a method and apparatus for processing images in a stereovision system to achieve the performance of high-performance cameras by obtaining image information by alternately grabbing images of a subject with a certain time interval without time synchronization using two low-price and low-performance cameras used in the stereovision system.

It is another object of the present invention to provide a method and apparatus for processing images in a stereovision system to reduce system load and efficiently capture images by switching shooting modes according to the state of a subject.

It is another object of the present invention to provide a method and apparatus for processing images in a stereovision system to obtain predicted image information based on image information received from a plurality of cameras included in the stereovision system and to detect physical characteristics, etc. of a subject based on the predicted image information.

Advantageous Effects

The present invention has effects and advantages as described below.

First, a stereovision system capable of achieving the performance of high-performance cameras by obtaining image information by alternately grabbing images of a subject with a certain time interval without time synchronization using two low-price and low-performance cameras used in the stereovision system may be implemented.

Second, a stereovision system capable of reducing system load and efficiently capturing images by switching shooting modes according to the state of a subject may be implemented.

Third, the accuracy of predicted image information may be increased by obtaining the predicted image information based on image information received from a plurality of cameras included in a stereovision system and detecting physical characteristics, etc. of a subject based on the predicted image information.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The above and other objects, features and other advantages of the present invention will be more clearly understood from the following detailed description taken in conjunction with the accompanying drawings, in which.

BEST MODE

Figure 1A:
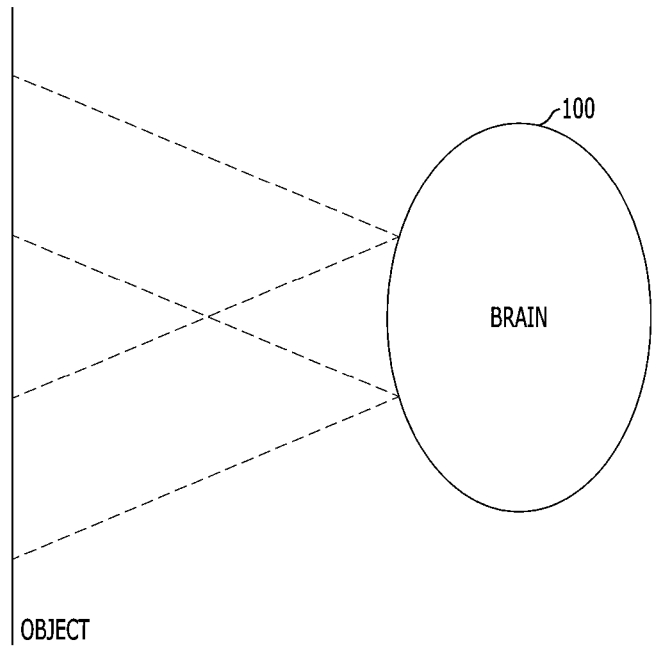
FIG. 1 is a view for describing a stereovision system.

In accordance with an aspect of the present invention, the above and other objects can be accomplished by the provision of an apparatus for processing images in a stereovision system, the apparatus including an image capture unit including a first camera and a second camera for obtaining image information by capturing images of a subject, and a lighting unit for flashing light to capture an image, and a camera controller for controlling the first and second cameras to obtain the image information by alternately grabbing images of the subject with a certain time interval without time synchronization.

The apparatus may further include a lighting controller for controlling the lighting unit to operate in time synchronization with the grabbing of the images by the first and second cameras.

The apparatus may further include an image analyzer for determining whether the subject stays still, based on the obtained image information, and a mode switching unit for switching a shooting mode of the image capture unit from a first mode to a second mode upon determining that the subject stays still, and the first and second cameras may obtain the image information by grabbing images of the subject in time synchronization in the first mode, and obtain the image information by alternately grabbing images of the subject with a certain time interval in the second mode.

The first and second cameras may obtain the image information in the second mode according to a signal transmitted from the camera controller.

The first and second cameras may grab images at a low speed in the first mode and grab images at a high speed in the second mode.

The image analyzer may include a hit sensor for sensing whether the subject is hit by a user, based on the image information obtained in the second mode.

The apparatus may further include a database for storing the image information obtained in the second mode by the first and second cameras.

The apparatus may further include an image estimator for, upon sensing that the subject is hit by the user, checking a point of impact, extracting the image information before/after the point of impact from the database, and obtaining predicted image information based on the extracted image information.

The image estimator may obtain first predicted image information using first image information and second image information received from the first camera and third image information received from the second camera.

The first image information and the second image information may correspond to sequential frame images received from the first camera, and the third image information may correspond to a frame image received from the second camera and obtained between the first image information and the second image information.

The apparatus may further include an image processor for obtaining physical characteristics of the subject based on the image information before/after the point of impact and the predicted image information.

In accordance with another aspect of the present invention, there is provided a method for processing images in a stereovision system, the method including obtaining image information of a subject in a first mode using an image capture unit including a first camera and a second camera, and a lighting unit for flashing light to capture an image, determining whether the subject stays still, based on the obtained image information, and switching a shooting mode of the image capture unit to a second mode upon determining that the subject stays still, wherein the first and second cameras obtain the image information by grabbing images of the subject in time synchronization in the first mode, and obtain the image information by alternately grabbing images of the subject with a certain time interval in the second mode.

The method may further include obtaining the image information in the switched second mode by the first and second cameras.

The method may further include sensing whether the subject is hit by a user, based on the image information obtained in the second mode.

The method may further include storing the image information obtained in the second mode in a database.

The method may further include, upon sensing that the subject is hit by the user, checking a point of impact, extracting the image information before/after the point of impact from the database, and obtaining predicted image information based on the extracted image information before/after the point of impact.

The predicted image information may be obtained using first image information and second image information received from the first camera and third image information received from the second camera.

The first image information and the second image information may correspond to sequential frame images received from the first camera, and the third image information may correspond to a frame image received from the second camera and obtained between the first image information and the second image information.

The method may further include obtaining physical characteristics of the subject based on the image information before/after the point of impact and the predicted image information.

The first and second cameras may grab images at a low speed in the first mode and grab images at a high speed in the second mode.

[Mode for Invention]

Reference will now be made in detail to the preferred embodiments of the present invention, examples of which are illustrated in the accompanying drawings. The terms used in this specification and the claims should not be restrictively construed as typical or lexical meanings but construed as meanings and concepts complying with the technical idea of the present invention based on the principle that an inventor can define the concepts of terms properly to optimally describe the inventor's invention. Accordingly, since the embodiments described herein and the configurations illustrated in the drawings merely correspond to preferred embodiments of the present invention and do not represent all technical ideas of the present invention, it should be noted that various equivalents and modifications thereof can be made.

Particularly, in this specification, the term "information" includes all of values, parameters, coefficients, elements, etc., and the meaning thereof is variable. As such, the present invention is not limited thereto.

FIG. 1 is a view for describing a stereovision system.

Referring to FIG. 1a, people can perceive an object stereoscopically because right and left eyes perceive different images. As images on the retinas of the two eyes are combined by the brain 100, a stereoscopic image is achieved due to a small difference between the obtained images. The obtained images are transmitted as electrical signals via optic nerves of the retinas to a process part of the brain 100, and the brain 100 detects features of the transmitted electrical signals through various processes and compares the features to information in the brain 100 to perceive a target object.

Figure 1B:
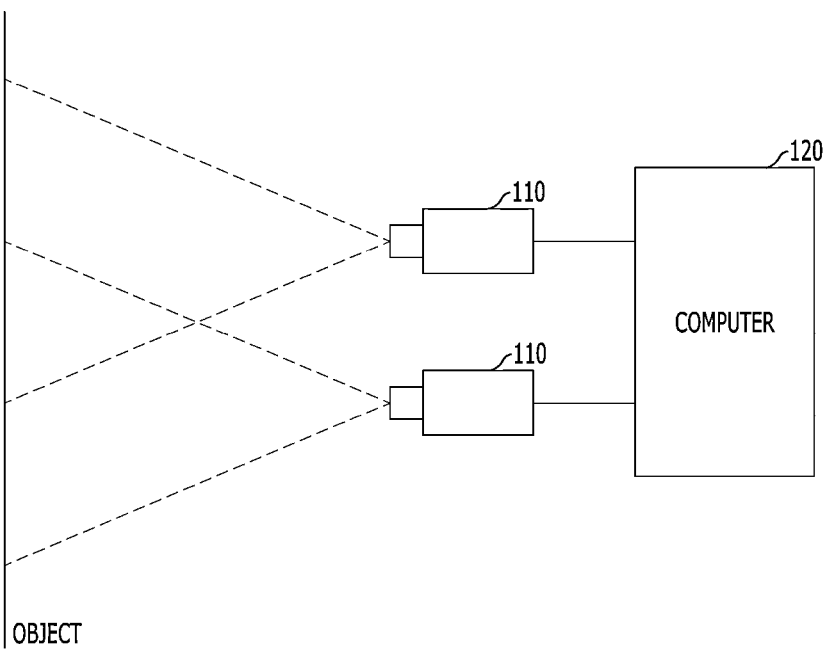

Referring to FIG. 1b, a stereovision system is a system in which a procedure for perceiving a target object via two eyes of a person is applied to computer vision. Accordingly, the stereovision system includes cameras 110 corresponding to the eyes of a person, and a computer 120 corresponding to the visual system of the person.

Figure 2:
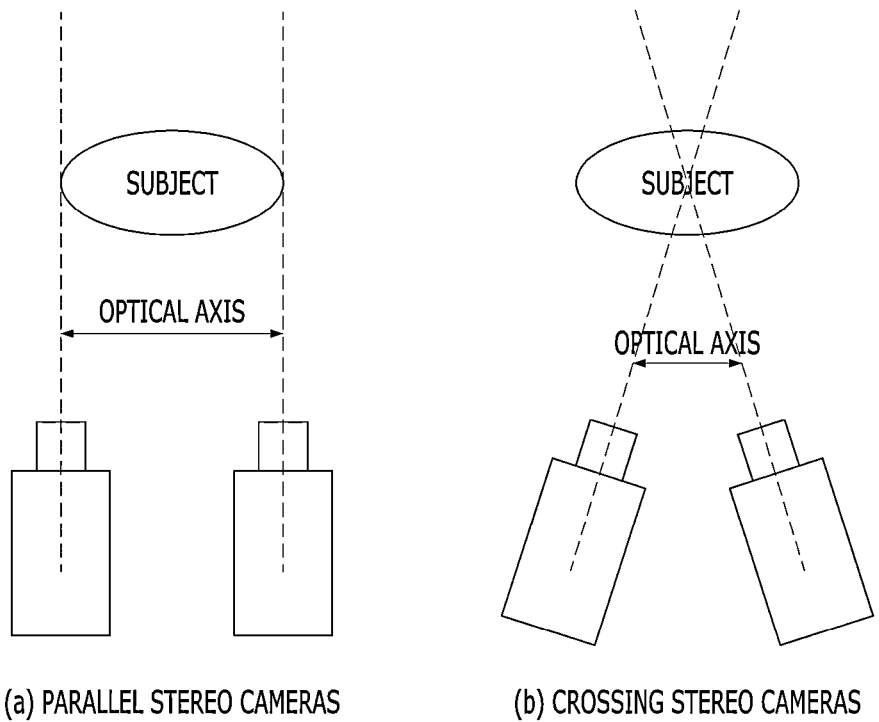
FIG. 2 is a view illustrating a camera setup method of a stereovision system.

FIG. 2 is a view illustrating a camera setup method of a stereovision system.

Referring to FIG. 2, the camera setup method of the stereovision system can be largely divided to sequential camera setup and simultaneous camera setup. The sequential camera setup corresponds to a method for sequentially inputting images using a single camera without setting up two cameras.

However, the simultaneous camera setup corresponds to a method for simultaneously obtaining images by setting up two cameras, and is generally used by current stereovision systems. The simultaneous camera setup is subdivided into (a) parallel camera setup and (b) crossing camera setup depending on camera configuration according to how optical axes of the cameras are configured. The parallel camera setup refers to a method for configuring the optical axes of the cameras to be vertically or horizontally parallel to each other, and the crossing camera setup refers a method for configuring the optical axes of the cameras to cross each other. The crossing camera setup is similar to the structure of the eyes of a person.

The parallel camera setup is advantageous in that distance measurement is easy but is disadvantageous in that there is no parallax control function and thus a high-quality stereoscopic image is not achievable. Compared to the parallel camera setup, the crossing camera setup is advantageous in that the distance to a rapidly moving object can be measured.

Figure 3:
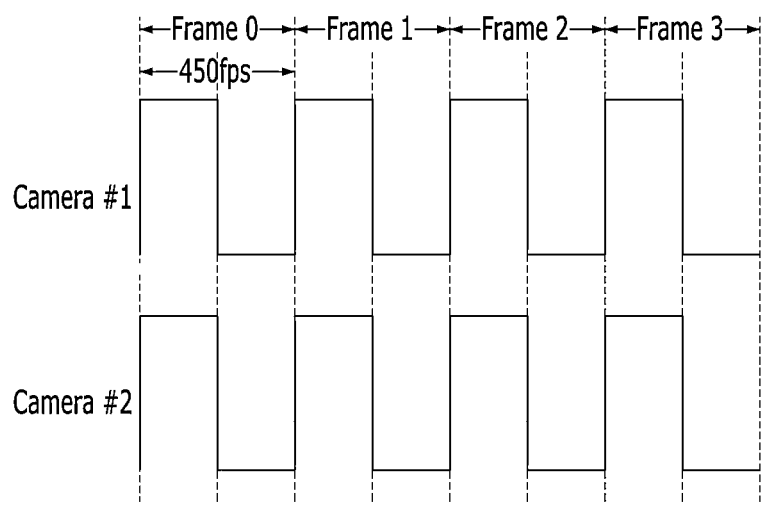
FIG. 3 is a view illustrating sequences for grabbing images by cameras in a general stereovision system.

FIG. 3 is a view illustrating sequences for grabbing images by cameras in a general stereovision system.

As illustrated in FIG. 3, based on four frames, images are grabbed in the general stereovision system at intersections of time-synchronized images captured by two different cameras and are grabbed by the cameras at a constant rate irrespective of the state of a subject.

For example, when images are captured using two cameras having a frame rate of 450 frames per second (fps) as illustrated in FIG. 3, 450 frame images can be obtained in every second by each camera and the distance, direction, etc. of a subject can be detected using time-synchronized images obtained by the respective cameras.

However, for a scene in which a subject stays still and then moves, if images are captured constantly in the same shooting mode (e.g., frame rate, grab sequence, etc.) without considering the state of the subject, unnecessary images may be captured and thus system load may be increased. For example, when a user hits a golf ball which stays still, a high frame rate is required after a point of impact to capture images of the rapidly moving subject. However, if images are captured at a high frame rate even in the still state before the point of impact, unnecessary images may be captured and thus system load may be increased.

Further, higher-performance cameras are inevitably necessary to capture close-up images of a rapidly moving subject and, for example, if two cameras having performance of 900 fps are used, the cameras are very expensive and thus a stereovision system is not easily configured.

Accordingly, a stereovision system capable of controlling a shooting mode according to the state of a subject is required, and a method for configuring a stereovision system using low-price cameras instead of high-price cameras to capture close-up images of a rapidly moving subject is also required.

Figure 4:
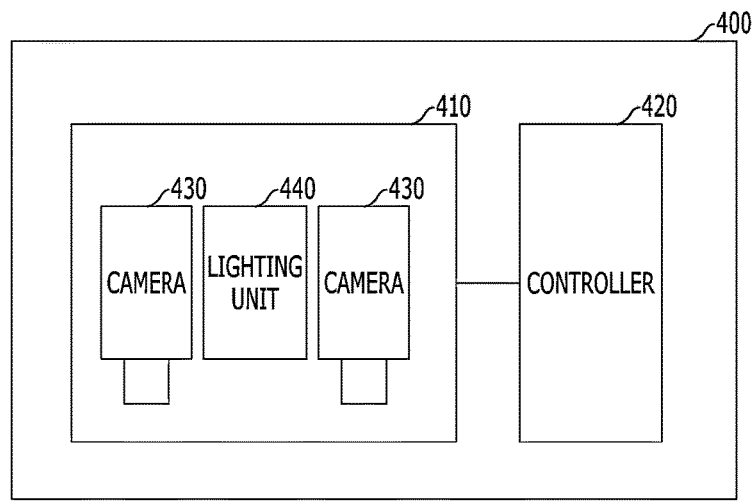
FIG. 4 is a block diagram illustrating the configuration of an image processing apparatus for stereovision according to an embodiment of the present invention.
Figure 5:
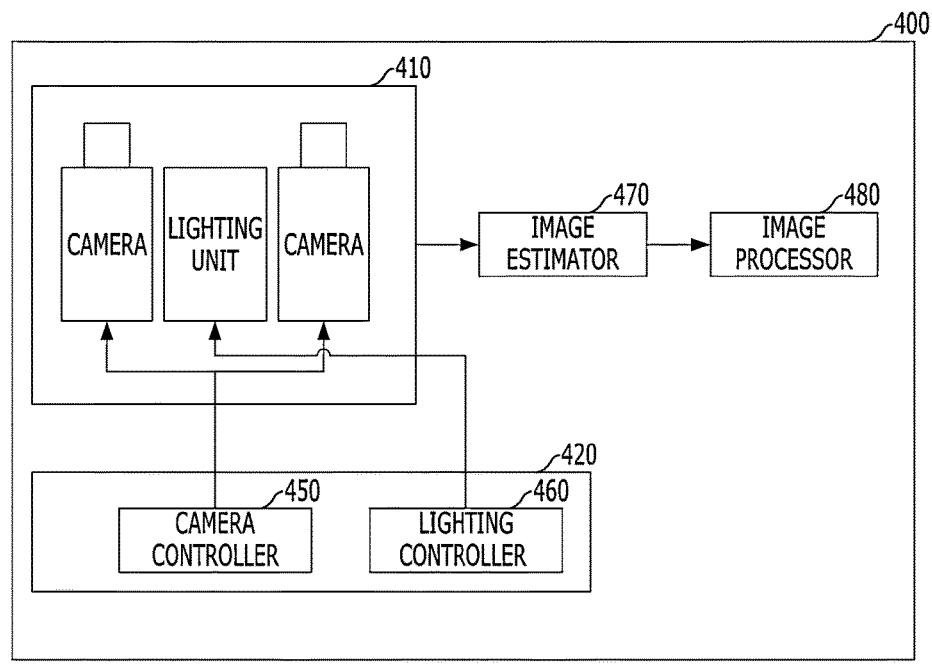
FIG. 5 is a block diagram illustrating detailed configuration, additional configuration and component functions of the image processing apparatus illustrated in FIG. 4.

FIG. 4 is a block diagram illustrating the configuration of an image processing apparatus 400 for stereovision according to an embodiment of the present invention, and FIG. 5 is a block diagram illustrating detailed configuration, additional configuration and component functions of the image processing apparatus 400 illustrated in FIG. 4.

As illustrated in FIG. 4, the image processing apparatus 400 according to the current embodiment of the present invention includes an image capture unit 410 and a controller 420. Further, the image capture unit 410 includes a plurality of cameras 430 for configuring a stereovision system, and a lighting unit 440 including at least one lighting device for flashing light to capture an image.

As described above in relation to FIG. 3, a general image processing apparatus for stereovision is configured to sequentially capture images of a subject in time synchronization in units of one or more frames. However, the image processing apparatus 400 according to the current embodiment of the present invention is characterized in that the cameras 430 alternately capture images of a subject.

For example, when an image processing apparatus including two cameras having a speed of 450 fps is configured to grab an image using a second camera Camera#2 1/900 sec. after an image is grabbed using a first camera Camera#1, the image capture performance of cameras having a speed of 900 fps may be achieved using the two cameras having a speed of 450 fps. In this case, since the images of the subject are captured from different locations, to extract three-dimensional (3D) information from the captured images, a procedure for estimating intermediate images between the images captured by each camera is additionally required.

The controller 420 controls the cameras 430 of the image capture unit 410 to grab images with a certain time interval, and controls the lighting unit 440 to operate when the cameras 430 grab the images.

A description of detailed configuration and component functions of the image processing apparatus 400 illustrated in FIG. 4 is now given with reference to FIG. 5.

As illustrated in FIGS. 4 and 5, in the image processing apparatus 400 according to the current embodiment of the present invention, information flows in the order of the image capture unit 410→an image estimator 470→an image processor 480, and the controller 420 includes a camera controller 450 and a lighting controller 460 to control the cameras 430 and the lighting unit 440.

In the image capture unit 410, the cameras 430 grab images with a certain time interval according to a signal of the camera controller 450, and the lighting unit 440 provides light according to a signal of the lighting controller 460 to correspond to the speed at which the cameras 430 grab the images.

For example, the camera controller 450 may control two cameras having a speed of 450 fps to grab an image using a second camera Camera#2 1/900 sec. after an image is grabbed using a first camera Camera#1, and the lighting controller 460 may control the lighting unit 440 to provide an optical environment in which cameras can capture images at a speed of 900 fps.

The first camera (e.g., left camera) and the second camera (e.g., right camera) of the image capture unit 410 alternately capture images with a certain time interval and obtain image information according to a signal of the camera controller 450. However, since the obtained image information is not information about images captured in time synchronization (that is, there is no intersection between image information obtained by the first camera and that obtained by the second camera) as described above, information about physical characteristics, e.g., 3D information, of a subject cannot be obtained based on this image information.

The image estimator 470 obtains predicted image information based on the image information received from the first and second cameras. Specifically, the image estimator 470 obtains first predicted image information using first image information and second image information received from the first camera and third image information received from the second camera.

The first image information and the second image information refer to sequential frame images received from the first camera, and the third image information refers to a frame image obtained between the first image information and the second image information by the second camera. A detailed description of a procedure for obtaining the predicted image information by the image estimator 470 will be given below with reference to FIG. 12.

The image processing apparatus 400 according to the current embodiment of the present invention may further include a grabber (not shown) for digitizing electrical image signals captured by the image capture unit 410, and a database (not shown) for storing the image information received from the image capture unit 410 and the predicted image information received from the image estimator 470.

The image processor 480 obtains information about physical characteristics of a subject using the image information received from the image capture unit 410, the predicted image information received from the image estimator 470, or the information stored in the database. For example, when images of a moving subject are captured using the image capture unit 410, the image processor 480 may obtain information about the distance to the subject, the speed and direction of the subject, etc. using the above information.

When the first camera Camera#1 and the second camera Camera#2 capture images in time synchronization in each frame as illustrated in FIG. 3, high-performance and high-price cameras are necessary to capture close-up images of a rapidly moving subject.

The present invention proposes a method capable of achieving the image capture performance of high-performance cameras using low-performance cameras by alternately capturing images, i.e., by adjusting grab sequences.

Figure 6:
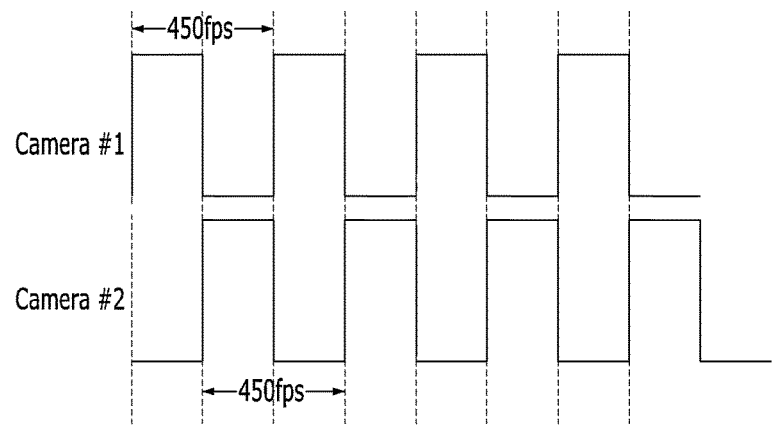
FIG. 6 is a view illustrating sequences for grabbing images by cameras in the image processing apparatus illustrated in FIG. 4.

A description of operation of the image processing apparatus 400 according to the current embodiment of the present invention is now given with reference to FIG. 6. Since those skilled in the art would know of operations of the image processing apparatus 400 other than an operation for grabbing images, the following description will be representatively given of the operation for grabbing images.

FIG. 6 is a view illustrating sequences for grabbing images by cameras in the image processing apparatus 400 illustrated in FIG. 4.

As illustrated in FIG. 6, the image processing apparatus 400 according to the current embodiment of the present invention is characterized in that two cameras alternately grab images.

That is, when images are captured using two cameras having performance of N fps (N>0 and N refers to a camera speed), the cameras are configured in such a manner that the second camera Camera#2 operates ½N sec. after the first camera Camera#1 operates. In this case, the image capture performance of cameras having performance of 2N fps may be achieved.

For example, when images are captured using two cameras having a performance of 450 fps as illustrated in FIG. 6, if an image is grabbed using the second camera Camera#2 1/900 sec. after an image is captured using the first camera Camera#1, the image capture performance of cameras having performance of 900 fps may be achieved.

The above principle of the present invention may be implemented by allowing the camera controller 450 to control a plurality of cameras as described above in relation to FIG. 5. That is, the camera controller 450 controls the second camera Camera#2 to grab an image a certain time (e.g., 1/900 sec. in FIG. 6) after the first camera Camera#1 grabs an image.

Figure 7:
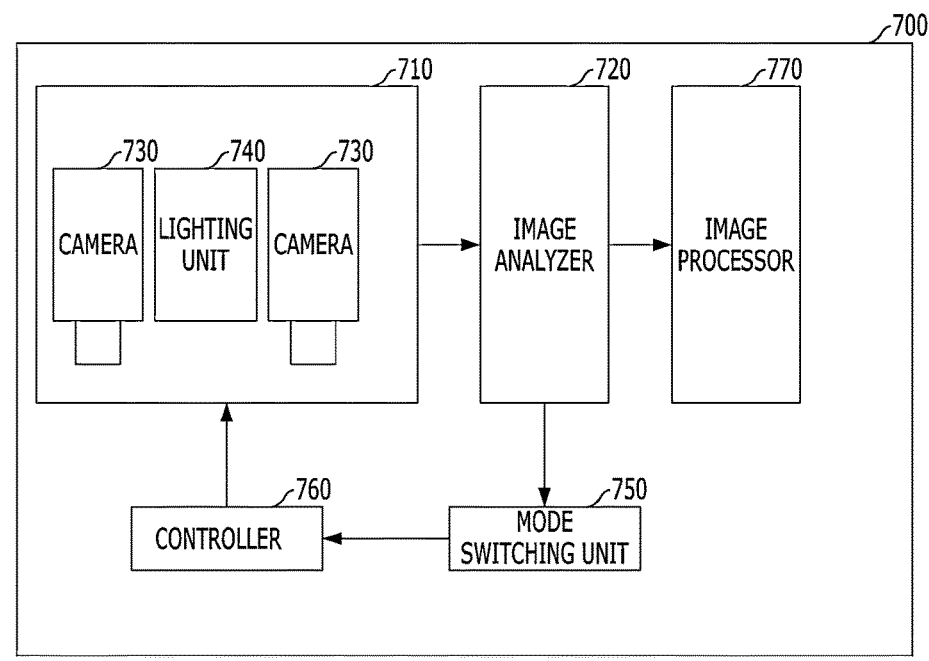
FIG. 7 is a block diagram illustrating the configuration of an image processing apparatus of a stereovision system capable of switching shooting modes, according to another embodiment of the present invention.
Figure 8:
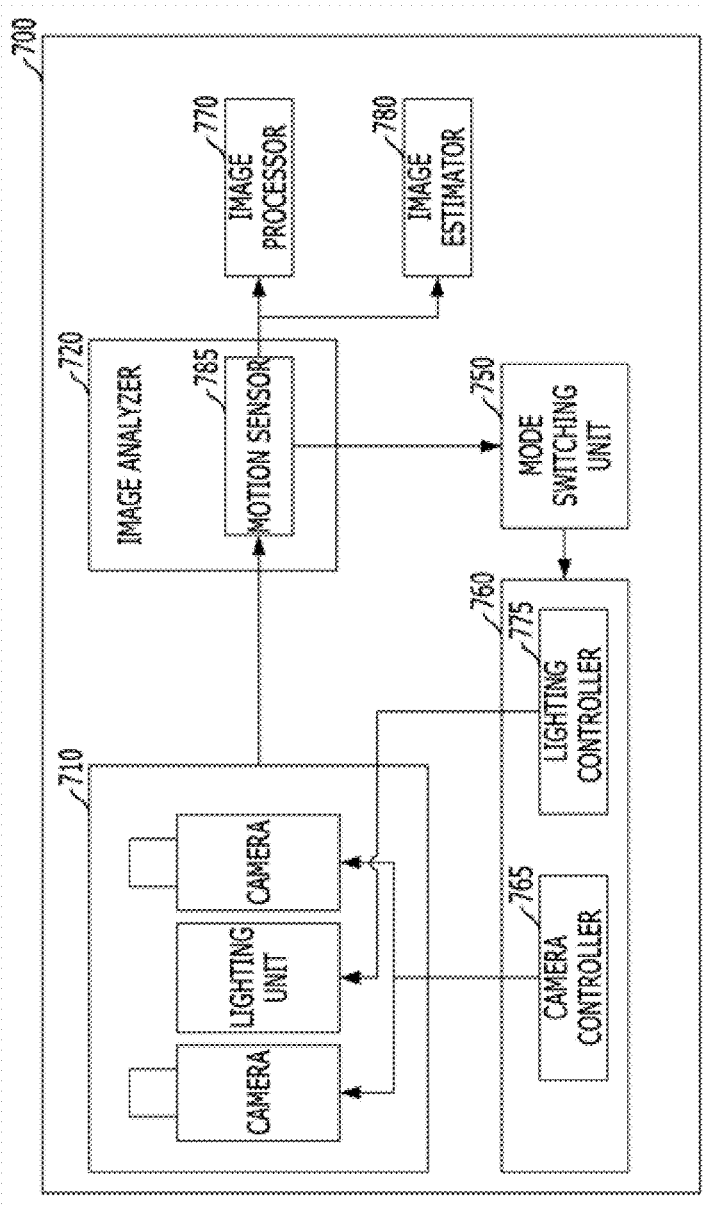
FIG. 8 is a block diagram illustrating detailed configuration, additional configuration and component functions of the image processing apparatus illustrated in FIG. 7.

FIG. 7 is a block diagram illustrating the configuration of an image processing apparatus 700 of a stereovision system capable of switching shooting modes, according to another embodiment of the present invention, and FIG. 8 is a block diagram illustrating detailed configuration, additional configuration and component functions of the image processing apparatus 700 illustrated in FIG. 7.

As illustrated in FIG. 7, the image processing apparatus 700 according to the current embodiment of the present invention includes an image capture unit 710, an image analyzer 720, a mode switching unit 750, a controller 760 and an image processor 770.

As described above in relation to FIG. 3, a general image processing apparatus for stereovision is configured to sequentially capture images of a subject in time synchronization in units of one or more frames at a constant frame rate irrespective of the state of the subject. However, the image processing apparatus 700 according to the current embodiment of the present invention is characterized in that a shooting mode is switched from a first mode to a second mode according to the state of a subject and, particularly, cameras alternately capture images of the subject in the second mode.

Here, the first mode and the second mode are distinguished based on a frame rate, a grabbing sequence, etc. For example, the frame rate is high and a plurality of cameras 730 configuring a stereovision system grab images of the subject in time synchronization in the first mode, and the frame rate is high and the cameras 730 alternately grab images of the subject with a certain time interval in the second mode.

If close-up images of a scene in which a subject stays still and then moves are captured, the images need to be captured at a high frame rate from a point of time when the subject starts moving from the still state (hereinafter referred to as a "play period"), but can be captured at a low frame rate before the subject starts moving (i.e., in the still state) (hereinafter referred to as a "ready period").

Accordingly, for instance, when images of a moving subject are captured using an image processing apparatus including two cameras having a speed of 450 fps, if the images are captured in the first mode in the ready period (for example, images of the subject are grabbed in time synchronization at a low speed, e.g., 30 fps) and captured in the second mode in the play period (for example, an image of the subject is grabbed using the second camera Camera#2 1/900 sec. after an image of the subject is grabbed using the first camera Camera#1), the image capture performance of cameras having a speed of 900 fps may be achieved using the two cameras having a speed of 450 fps in the play period in which images need to be captured at a high speed, and system load caused when a large number of unnecessary images are captured may be reduced in the ready period in which images can be captured at a low speed.

As described above, when images are captured in the second mode, since the images of the subject are captured from different locations, to extract 3D information from the captured images, a procedure for estimating intermediate images between the images captured by each camera is additionally required.

The image analyzer 720 determines whether the subject stays still, based on images received from the image capture unit 710, and the mode switching unit 750 switches the shooting mode of the image capture unit 710 to the second mode upon determining that the subject stays still.

The controller 760 may control the cameras 730 of the image capture unit 710 to grab images of the subject in time synchronization at a low speed in the first mode and to alternately grab images of the subject with a certain time interval at a high speed in the second mode according to a signal of the mode switching unit 750, and control a lighting unit 740 to operate when the cameras 730 grab the images.

A description of detailed configuration and component functions of the image processing apparatus 700 illustrated in FIG. 7 is now given with reference to FIG. 8.

As illustrated in FIGS. 7 and 8, in the image processing apparatus 700 according to the current embodiment of the present invention, information flows in the order of the image capture unit 710→the image analyzer 720→the mode switching unit 750→the controller 760, and the controller 760 includes a camera controller 765 and a lighting controller 775 to control the cameras 730 and the lighting unit 740.

In the image capture unit 710, the cameras 730 grab images in the first mode or the second mode according to a signal of the camera controller 765, and the lighting unit 740 provides light according to a signal of the lighting controller 775 to correspond to the speed at which the cameras 730 grab the images.

The image analyzer 720 determines whether the subject stays still, based on image information received from the image capture unit 710 in the first mode and, specifically, using a motion sensor 785 included in the image analyzer 720 as illustrated in FIG. 8.

Upon determining that the subject stays still, the mode switching unit 750 switches the shooting mode of the image capture unit 710 from the first mode to the second mode, and the camera controller 765 controls the image capture unit 710 to capture images in the second mode according to a signal of the mode switching unit 750.

For example, when the shooting mode is switched to the second mode, the camera controller 765 may control two cameras having a speed of 450 fps to grab an image using the second camera Camera#2 $\frac{1}{900}$ sec. after an image is grabbed using the first camera Camera#1, and the lighting controller 775 may control the lighting unit 740 to provide an optical environment in which cameras can capture images at a speed of 900 fps.

Further, the first camera (e.g., left camera) and the second camera (e.g., right camera) of the image capture unit 710 alternately capture images with a certain time interval and obtain image information according to a signal of the camera controller 750, and an image estimator 780 obtains predicted image information based on the image information obtained in the second mode and transmitted by the first and second cameras.

Figure 9:
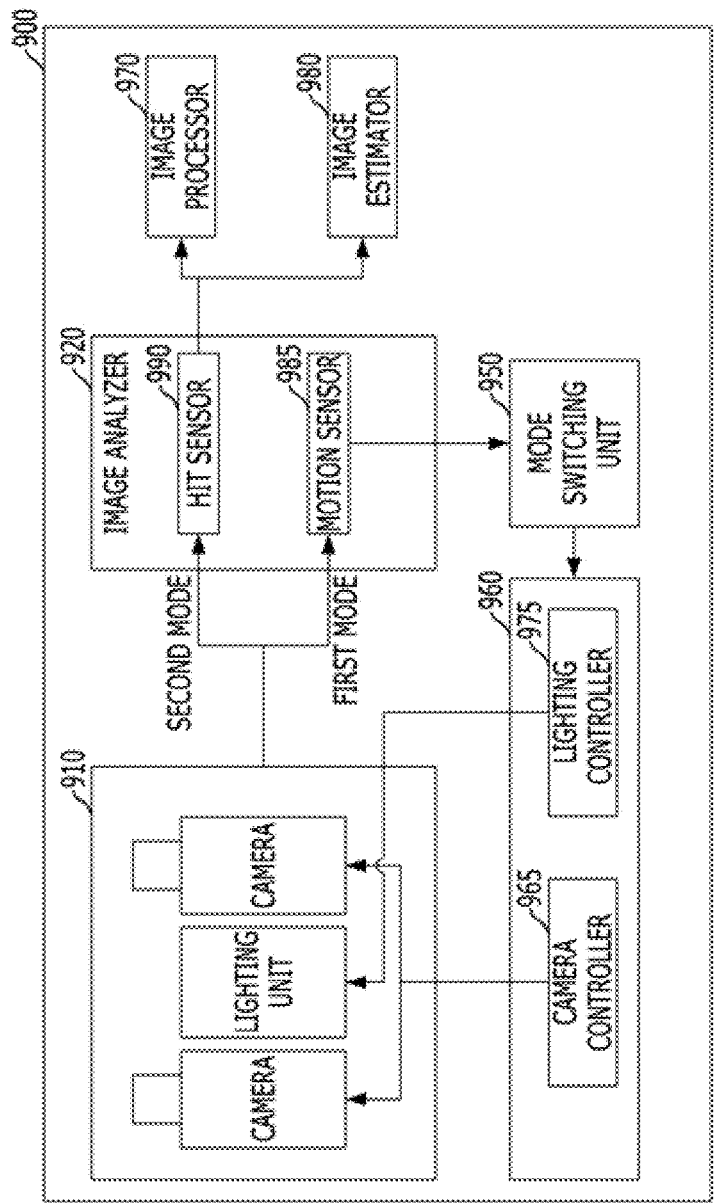
FIG. 9 is a block diagram illustrating the configuration of an image processing apparatus of a stereovision system operating in a second mode, according to another embodiment of the present invention.

FIG. 9 is a block diagram illustrating the configuration of an image processing apparatus 900 of a stereovision system operating in the second mode, according to another embodiment of the present invention.

As illustrated in FIG. 9, in the image processing apparatus 900 according to the current embodiment of the present invention, information flows in the order of an image capture unit 910→an image analyzer 920→a mode switching unit 950→a controller 960 in the first mode, and in the order of the image capture unit 910→the image analyzer 920→an image estimator 970→an image processor 980 in the second mode.

The functions of the image capture unit 910 and the controller 960 have been described above and thus are not described below. In the image processing apparatus 900 according to the current embodiment of the present invention, the image analyzer 920 includes a motion sensor 985 for determining whether a subject stays still, based on image information obtained in the first mode by the image capture unit 910, and a hit sensor 990 for determining whether the subject is hit by a user, based on image information obtained in the second mode by the image capture unit 910. As described above, the mode switching unit 950 switches a shooting mode of the image capture unit 910 based on the determination result of the motion sensor 985.

The hit sensor 990 determines whether the subject is hit by the user, based on the image information obtained in the second mode and, upon determining that the subject is hit by the user, an image estimator 980 checks a point of impact, obtains image information before/after the point of impact from the image capture unit 910 or a database (not shown), and obtains predicted image information based on the image information.

Figure 10:
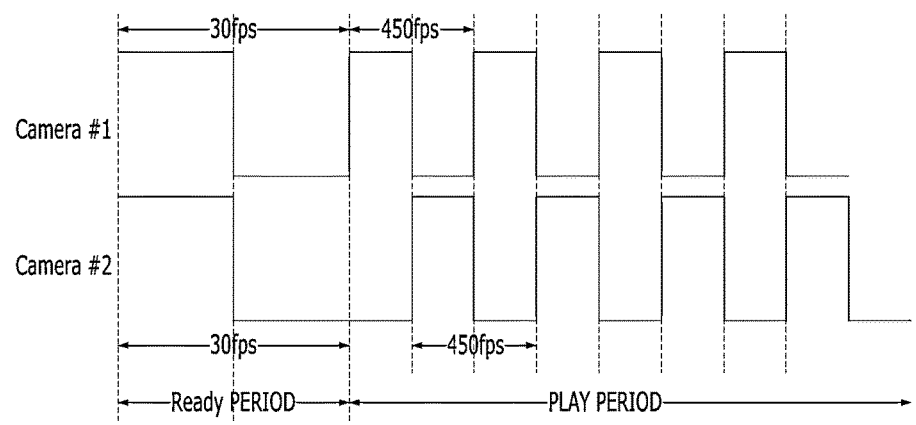
FIG. 10 is a view illustrating sequences for grabbing images by cameras in the image processing apparatus illustrated in FIG. 9.

FIG. 10 is a view illustrating sequences for grabbing images by cameras in the image processing apparatus 900 illustrated in FIG. 9.

As illustrated in FIG. 10, the image processing apparatus 900 according to the current embodiment of the present invention is characterized in that a ready period and a play period are distinguished based on whether a subject stays still, images are captured in the first mode in the ready period, and images are captured in the second mode in the play period.

For example, a plurality of cameras grab images of the subject in time synchronization at a low speed (e.g., frame rate of 30 fps) in the ready period, and alternately grab images of the subject with a certain time interval at a high speed (e.g., frame rate of 450 fps) in the play period, thereby obtaining image information.

When images are captured using two cameras having performance of N fps (N>0 and N refers to a camera speed), the cameras are configured in such a manner that images are grabbed constantly at a low speed in the ready period and that a second camera Camera#2 operates ½N sec. after the first camera Camera#1 operates in the play period. In this case, the image capture performance of cameras having performance of 2N fps may be achieved.

Further, if images are captured by switching a shooting mode between the first mode and the second mode in the ready period and the play period as illustrated in FIG. 10, system load caused when unnecessary images are captured may be reduced or prevented from being increased.

Figure 11:
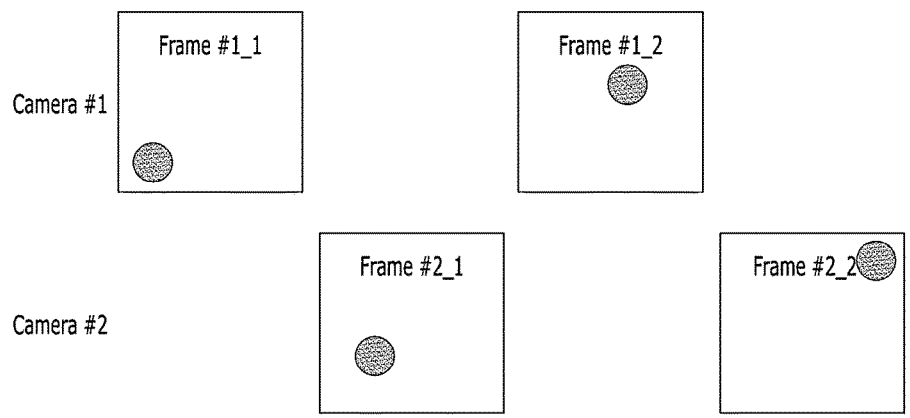
FIG. 11 is a view illustrating images captured in the second mode using the image processing apparatus illustrated in FIG. 7 or 9.

FIG. 11 is a view illustrating images captured in the second mode using the image processing apparatus 700 or 900 illustrated in FIG. 7 or 9.

As illustrated in FIG. 11, the images captured in the second mode using the image processing apparatus 700 or 900 are alternately obtained by the first camera Camera#1 and the second camera Camera#2.

In this case, since there is no intersection between the images obtained by the two cameras, 3D information, etc. of a subject cannot be obtained. Accordingly, a procedure for obtaining intermediate images between the images obtained by each camera is required.

Figure 12:
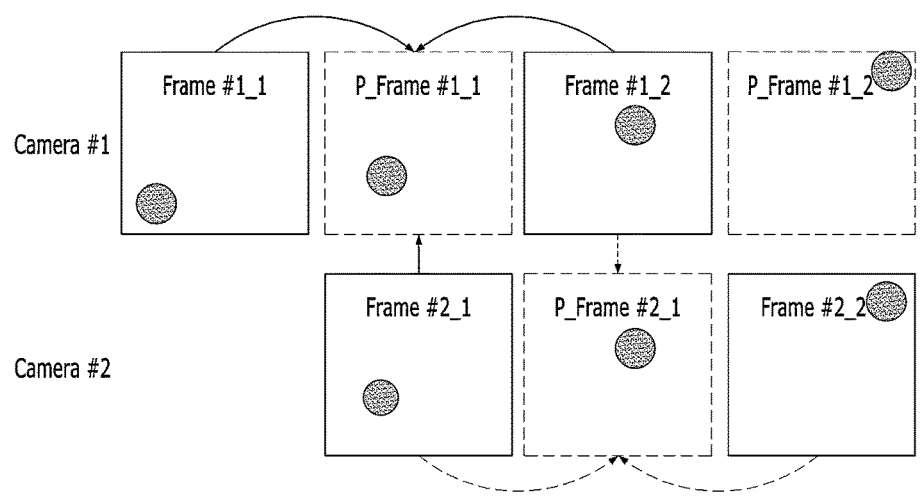
FIG. 12 is a view illustrating a method for estimating images between the images captured in the second mode using the image processing apparatus illustrated in FIG. 7 or 9.

FIG. 12 is a view illustrating a method for estimating images between the images captured in the second mode using the image processing apparatus 700 or 900 illustrated in FIG. 7 or 9.

The images captured in the second mode using the image processing apparatus 700 or 900 are alternately obtained by two cameras and thus time-synchronized images may not be directly obtained.

Accordingly, as illustrated in FIG. 12, a first predicted image P_frame#1_1 may be obtained using a first frame image frame#1_1 and a second frame image frame#1_2 of the first camera Camera#1 and, in the same manner, a second predicted image P_frame#1_2 may be obtained using the second frame image frame#1_2 and a third frame image frame#1_3 of the first camera Camera#1.

If images of a rapidly moving subject (e.g., golf ball or baseball) are estimated using the above method, it is very hard to predict the speed, direction, spin, etc., of the golf ball or baseball and the accuracy thereof is inevitably very low.

Accordingly, to increase the accuracy of predicted images, the image processing apparatus 700 or 900 obtains the first predicted image P_frame#1_1 using three images including a first frame image frame#2_1 of the second camera Camera#2 as well as the first frame image frame#1_1 and the second frame image frame#1_2 of the first camera Camera#1.

For example, if the parallel stereo cameras of FIG. 2a are used, an image captured using the first camera Camera#1 and an image captured using the second camera Camera#2 have the same two coordinate values in the x, y and z coordinate system. If the crossing stereo cameras of FIG. 2b are used, one coordinate value is the same. Accordingly, compared to a case in which two images (e.g., frame#1_1 and frame#1_2) are used as described above, the accuracy of the first predicted image P_frame#1_1 may be increased using three images (e.g., frame#1_1, frame#1_2 and frame#2_1).

In the image processing apparatus 700 or 900, various methods may be used to predict an image using three images. For example, an image may be estimated using the difference between a previous image and a current image, or using motion of a subject by dividing one image into blocks.

Those skilled in the art would know of image estimation methods other than the above-described methods.

Figure 13:
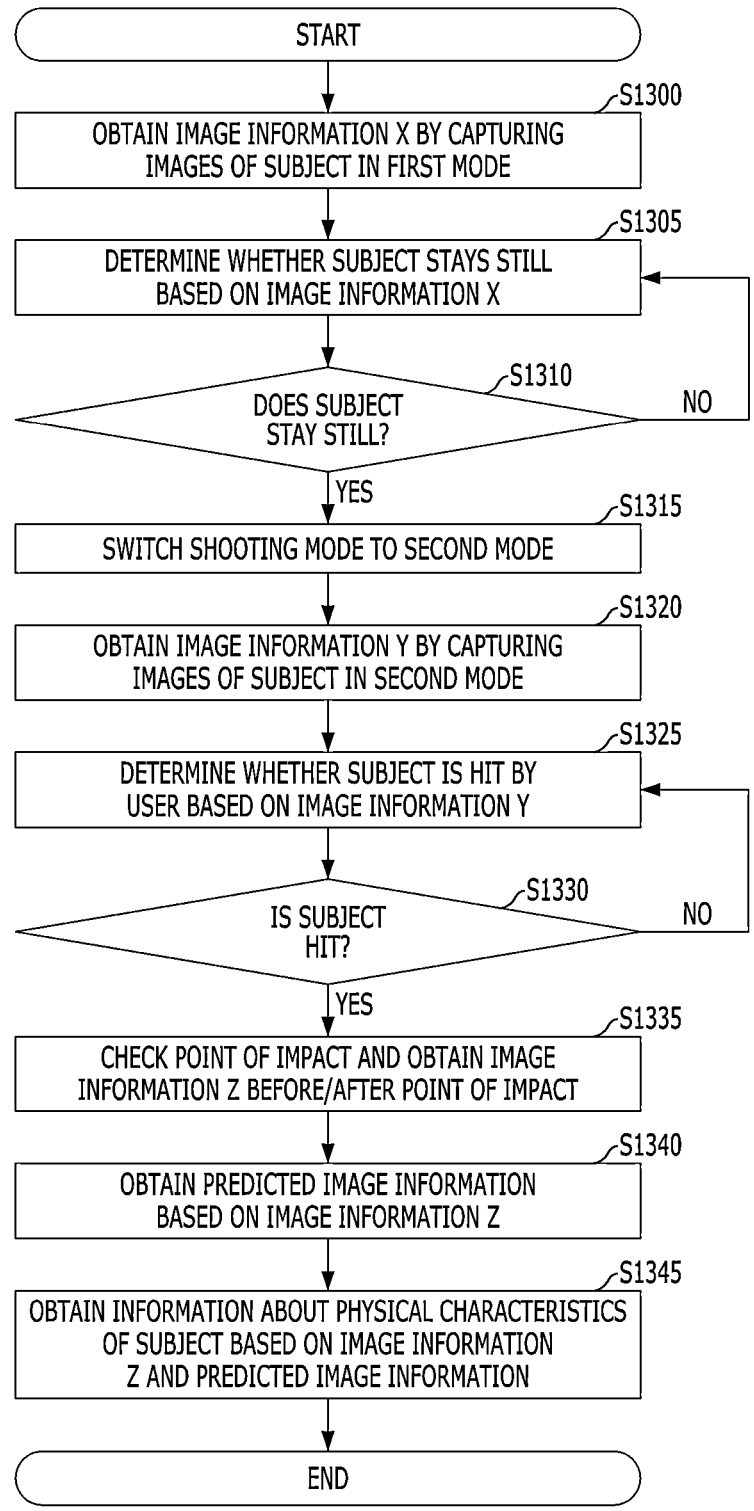
FIG. 13 is a flowchart illustrating a procedure for obtaining image information using an image processing apparatus according to an embodiment of the present invention.

FIG. 13 is a flowchart illustrating a procedure for obtaining image information using an image processing apparatus according to an embodiment of the present invention.

Referring to FIG. 13, initially, image information X is obtained by capturing images of a subject in a first mode (S1300), and whether the subject stays still is determined based on the image information X (S1305).

Upon determining that the subject stays still (S1310), a shooting mode is switched to a second mode (S1315). Upon determining that the subject does not stay still (S1310), whether the subject stays still is determined again based on the image information X (S1305).

Then, image information Y is obtained by capturing images of the subject in a second mode (S1320), and whether the subject is hit by a user is determined based on the image information Y (S1325).

Upon determining that the subject is hit by the user (S1330), a point of impact is checked and image information Z before/after the point of impact is obtained (S1335). Upon determining that the subject is not hit by the user (S1330), whether the subject is hit by the user is determined again based on the image information Y (S1325).

Then, predicted image information is obtained based on the image information Z (S1340), and information about physical characteristics of the subject is obtained based on the image information Z and the predicted image information (S1345).

As described above, an image processing apparatus according to an embodiment of the present invention may be used in various industrial fields and sports. A description is now given of a sensing apparatus for virtual golf simulation which includes an image processing apparatus according to an embodiment of the present invention.

Figure 14A:
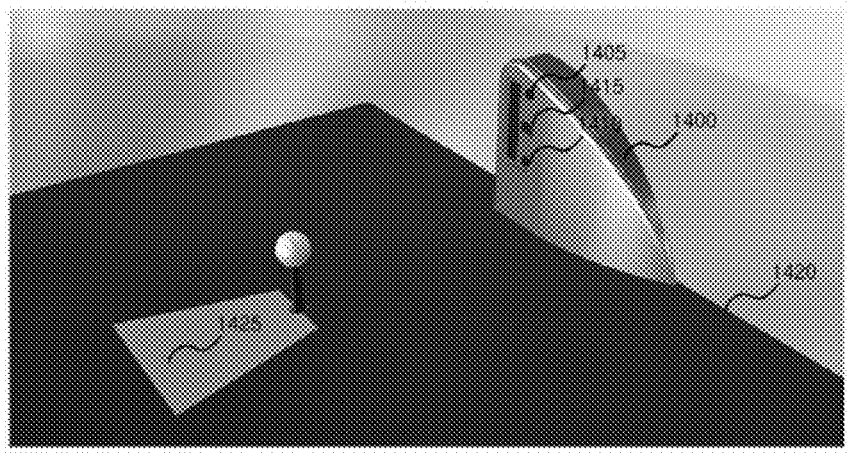
FIG. 14 is a view illustrating a sensing apparatus for virtual golf simulation which includes an image processing apparatus according to an embodiment of the present invention.
Figure 14B:
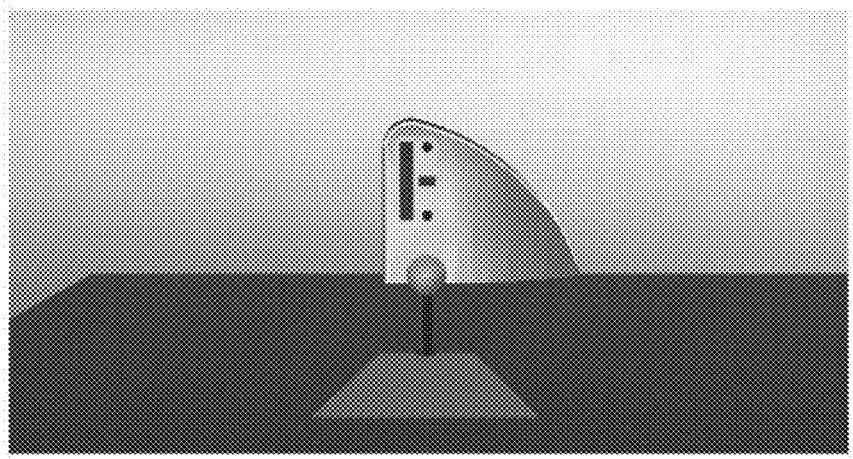
Figure 14C:
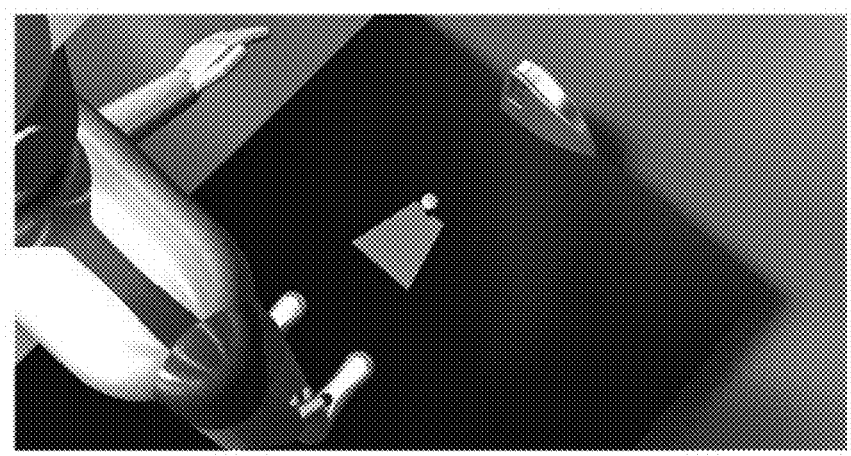
Figure 15:
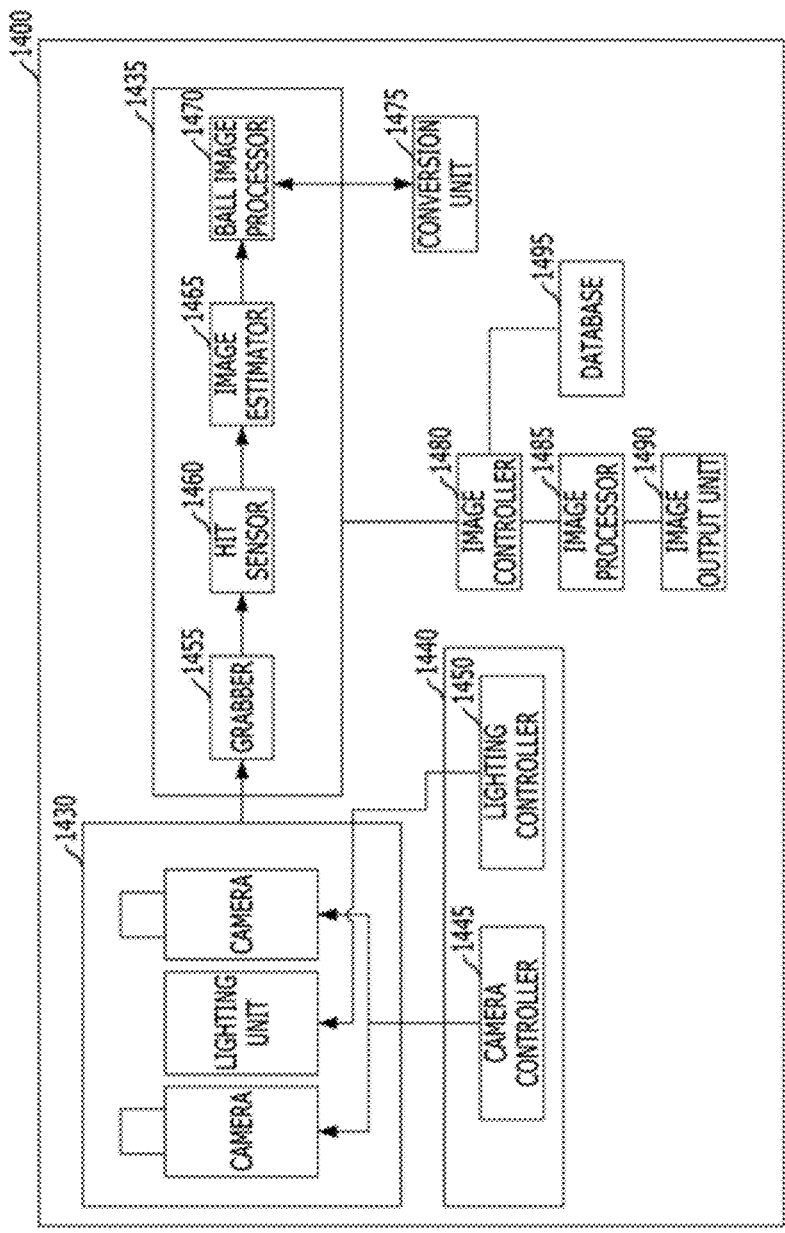
FIG. 15 is a block diagram illustrating the configuration of the sensing apparatus illustrated in FIG. 14.

FIG. 14 is a view illustrating a sensing apparatus 1400 for virtual golf simulation which includes an image processing apparatus according to an embodiment of the present invention, and FIG. 15 is a block diagram illustrating the configuration of the sensing apparatus 1400 illustrated in FIG. 14.

In general, a virtual golf simulation apparatus includes the sensing apparatus 1400 for sensing whether a ball is hit by a user, and a simulator (not shown) for displaying an image of a virtual golf course and executing virtual golf simulation by providing a simulation image showing the trajectory of the ball on the virtual golf course according to the sensing result of the sensing apparatus 1400.

As illustrated in FIG. 14, in a virtual golf simulation apparatus, a hitter's box 1420 for a user's golf swing may be prepared on the floor of a golf booth which provides a space of a certain size, a hitting mat 1425 may be prepared at a side of the hitter's box 1420 to allow the user to hit a ball put on the hitting mat 1425 by swinging a golf club within the hitter's box 1420, and a screen may be prepared ahead to display an image output from an image output device which receives image information from a simulator.

As illustrated in FIGS. 14 and 15, the sensing apparatus 1400 according to the current embodiment of the present invention includes an image capture unit 1430 including a plurality of cameras 1405 and 1410 and a lighting unit 1415, a sensing processor 1435 for extracting physical characteristics of a moving ball by processing images captured by the image capture unit 1430, an image processor 1485 for receiving sensing information and image information from the sensing processor 1435 and performing image processing to obtain an image of a virtual golf course or a simulation image showing the trajectory of the ball on the virtual golf course, an image output unit 1490 for outputting image information received from the image processor 1485, on a screen to be viewed by the user, a database 1495 for storing image information received from the image capture unit 1430, and an image controller 1480 for controlling operations of the image processor 1485, the image output unit 1490 and the database 1495.

The image capture unit 1430 may include two time-synchronized cameras to configure a stereovision system. However, to extract physical characteristics of a ball (e.g., speed, direction, spin, etc. of the ball) by capturing close-up images of, for example, a rapidly moving golf ball using low-price cameras, the image capture unit 1430 may be configured to grab images using two alternate cameras as described above.

The sensing processor 1435 includes a grabber 1455 for sequentially receiving and collecting the images obtained by the image capture unit 1430, on a frame basis, an image analyzer 1400 for receiving the images transmitted from the grabber 1455 and determining whether a subject stays still, a mode switching unit 1410 for switching a shooting mode of the image capture unit 1430 to a second mode upon determining that the subject stays still, a hit sensor 1460 for receiving and processing the images transmitted from the grabber 1455 and sensing whether a hit is ready and whether a hit is made by the user, an image estimator 1465 for, if a hit is sensed by the hit sensor 1460, checking a point of impact, extracting image information before/after the point of impact from the database 1495, and obtaining predicted image information based on the image information, a ball image processor 1470 for extracting physical characteristics of a ball, which is the subject, based on the image information before/after the point of impact and the predicted image information, and a conversion unit 1475 for converting two-dimensional (2D) information of a plurality of cameras of the image capture unit 1430 into 3D information by matching the image information received from the image capture unit 1430 to the predicted image information received from the image estimator 1465, or inversely converting the 3D information into 2D information.

The image processor 1485 performs image processing to obtain an image of a virtual golf course or a simulation image showing the trajectory of the ball on the virtual golf course, the image output unit 1490 outputs the image information received from the image processor 1485 on a screen to be visually viewed by the user, and the database 1495 stores all types of data related to the sensing apparatus 1400.

Figure 16:
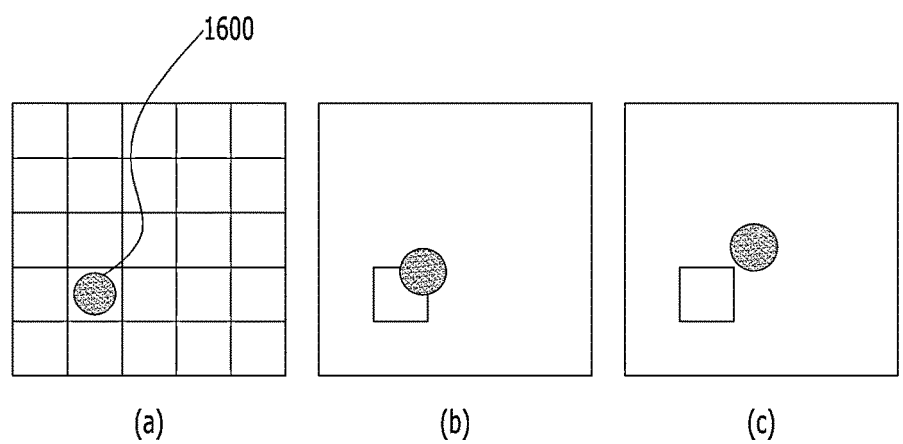
FIG. 16 is a view illustrating a procedure for sensing whether a subject such as a ball is hit by a user using a hit sensor of a sensing apparatus according to an embodiment of the present invention.

FIG. 16 is a view illustrating a procedure for sensing whether a subject such as a ball is hit by a user using a hit sensor of a sensing apparatus according to an embodiment of the present invention.

As illustrated in FIG. 16a, the hit sensor 1460 sets a hit area on source images of a plurality of frames and searches the hit area for the ball. In general, an area corresponding to the hitting mat 1425 is set as the hit area. If the hit area is set and searched for the ball as described above, the ball can be detected much more rapidly and accurately compared to a case in which the whole source image is searched.

The hit sensor 1460 may detect the ball using various methods. For example, similarity between a ball template which is preset and stored as a reference image of the ball and a specific object which exists within the hit area may be analyzed and the specific object may be determined as the ball if the similarity is equal to or greater than a certain level.

As illustrated in FIG. 16b, a sensing area 1600 having a size sufficiently including one ball may be set with respect to the detected ball, and the hit sensor 1460 may determine whether the ball is hit by the user, based on whether the ball exists in the sensing area 1600.

For example, when the ball is in the state of FIG. 16b, if it is sensed that the ball no longer exists in the sensing area 1600 as illustrated in FIG. 16c, the hit sensor 1460 may determine that the ball is hit by the user. Upon sensing that the ball, which is the subject, is hit by the user, the hit sensor 1460 checks a plurality of frame images before the sensing to detect an accurate point of time when the ball starts moving, i.e., a point of impact, stores image information of a plurality of frames before/after the point of impact in the database 1495, and transmits the image information to the image estimator 1465. The image estimator 1465 obtains predicted image information based on the image information.

The ball image processor 1470 calculates physical characteristic information including the speed, direction, spin, etc. of the moving ball based on the image information before/after the point of impact which is received from the hit sensor 1460 and the predicted image information received from the image estimator 1465.

The physical characteristic information of the ball obtained by the ball image processor 1470 is transmitted to a simulator (not shown), and the simulator performs virtual golf simulation by outputting a simulation image of the ball on a virtual golf course via the image output unit 1490 based on the physical characteristic information.

As described above, the present invention may provide a method and apparatus for processing images in a stereovision system to achieve the performance of high-performance cameras by obtaining image information by alternately grabbing images of a subject with a certain time interval without time synchronization using two low-price and low-performance cameras used in the stereovision system.

The present invention may also provide a method and apparatus for processing images in a stereovision system to reduce system load and efficiently capture images by switching shooting modes according to the state of a subject.

The present invention may also provide a method and apparatus for processing images in a stereovision system to obtain predicted image information based on image information received from a plurality of cameras included in the stereovision system and to detect physical characteristics, etc. of a subject based on the predicted image information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to switch shooting modes of a stereovision system according to the state of a subject.

The invention claimed is:

1. An apparatus for extracting a three-dimensional information of a subject by processing images in a stereovision system, the apparatus comprising:
an image capture unit comprising a first camera for capturing first images of the subject, a second camera for capturing second images of the subject, the first and the second images having a different view of the subject, and a lighting unit for flashing light for the first and the second cameras to capture the first and second images;
a camera controller configured to control the first and the second cameras by alternatively capturing the first and the second images of the same subject in order at a predetermined time interval without time synchronization;
an image estimator configured
to estimate first estimated intermediate images between two consecutive first images, wherein each of the first estimated intermediate images is correspondent to each of the camera controller captured images of the second camera, and
to estimate second estimated intermediate images between two consecutive second images, wherein each of the second estimated intermediate images is correspondent to each of the camera controller captured images of the first camera;
an image processor configured to extract the three-dimensional information of the subject by using the first images and the first estimated intermediate images at the same time, or using the second images and the second estimated intermediate images at the same time; and
a mode switching unit for switching a shooting mode of the image capture unit from a first mode to a second mode upon determining that the subject stays still,
wherein the first and second cameras obtain the image information by grabbing images of the subject in time synchronization in the first mode by the image capture unit, and obtain the image information by alternately grabbing images of the subject with a certain time interval in the second mode by the camera controller, the image estimator, and the image processor.

2. The apparatus according to claim 1, further comprising a lighting controller for controlling the lighting unit to operate in time synchronization with the grabbing of the images by the first and second cameras.

3. The apparatus according to claim 1, further comprising:
an image analyzer for determining whether the subject stays still, based on the obtained image information.

4. The apparatus according to claim 3, wherein the first and second cameras obtain the image information in the second mode according to a signal transmitted from the camera controller.

5. The apparatus according to claim 4, wherein the first and second cameras grab images at a low speed in the first mode and grab images at a high speed in the second mode.

6. The apparatus according to claim 4, wherein the image analyzer comprises a hit sensor for sensing whether the subject is hit by a user, based on the image information obtained in the second mode.

7. The apparatus according to claim 6, further comprising a database for storing the image information obtained in the second mode by the first and second cameras.

8. The apparatus according to claim 7, wherein the image estimator is configured to check a point of impact upon sensing that the subject is hit by the user, extract images from the first and the second images before and after the point of impact from the database, and obtain predicted images as the first and the second estimated intermediate images based on the extracted images.

9. The apparatus according to claim 8, wherein the image estimator is configured to obtain each predicted image by using the two consecutive first images and one of the second images which is taken between the two consecutive first images.

10. The apparatus according to claim 9, wherein the two consecutive first images correspond to sequential frame images received from the first camera, and the one of the second images corresponds to a frame image received from the second camera, which is taken between the two consecutive first images.

11. The apparatus according to claim 8, wherein the image processor is configured to obtain physical characteristics of the subject based on the first and the second images before and after the point of impact and the predicted images.

12. A method for extracting a three-dimensional information of a subject by processing images in a stereovision system, the method comprising:
    obtaining image information of the subject in a first mode using an image capture unit comprising a first camera for capturing first images of the subject, a second camera for capturing second images of the subject, the first and the second images having a different view of the subject, and a lighting unit for flashing light for the first and the second cameras to capture the first and second images;
    determining whether the subject stays still, based on the obtained image information;
    switching a shooting mode of the image capture unit to a second mode by using a camera controller, an image estimator, and an image processor;
    controlling, by the camera controller, the first and the second cameras by alternatively capturing the first and the second images of the same subject in order at a predetermined time interval without time synchronization;
    estimating, by the image estimator,
        first estimated intermediate images between two consecutive first images, wherein each of the first estimated intermediate images is correspondent to each of the camera controller captured images of the second camera, and
        second estimated intermediate images between two consecutive second images, wherein each of the second estimated intermediate images is correspondent to each of the camera controller captured images of the first camera; and
    extracting, by the image processor, the three-dimensional information of the subject by using the first images and the first estimated intermediate images at the same time, or using the second images and the second estimated intermediate images at the same time.

13. The method according to claim 12, further comprising obtaining the image information in the switched second mode by the first and second cameras.

14. The method according to claim 13, further comprising sensing whether the subject is hit by a user, based on the image information obtained in the second mode.

15. The method according to claim 14, further comprising storing the image information obtained in the second mode in a database.

16. The method according to claim 15, further comprising, upon sensing that the subject is hit by the user, checking a point of impact, extracting the image information before and after the point of impact from the database, and obtaining predicted image information based on the extracted image information before and after the point of impact.

17. The method according to claim 16, wherein the predicted image information is obtained using the two consecutive first images and one of the second images which is taken between the two consecutive first images.

18. The method according to claim 17, wherein the two consecutive first images correspond to sequential frame images received from the first camera, and the one of the second images corresponds to a frame image received from the second camera, which is taken between the two consecutive first images.

19. The method according to claim 16, further comprising, by the image processor, obtaining physical characteristics of the subject based on the image information before and after the point of impact and the predicted image information.

20. The method according to claim 12, wherein the first and second cameras grab images at a low speed in the first mode and grab images at a high speed in the second mode.

* * * * *